(12) United States Patent
Harrill et al.

(10) Patent No.: US 7,874,078 B2
(45) Date of Patent: Jan. 25, 2011

(54) VEHICLE DIMENSIONAL MEASURING SYSTEM

(76) Inventors: Mitchell C. Harrill, 140 Jenkins Rd., Rossville, GA (US) 30741; Elena Harrill, 140 Jenkins Rd., Rossville, GA (US) 30741

( * ) Notice: Subject to any disclaimer, the term of this patent is extended or adjusted under 35 U.S.C. 154(b) by 347 days.

(21) Appl. No.: 11/903,033

(22) Filed: Sep. 20, 2007

(65) Prior Publication Data

US 2008/0072444 A1    Mar. 27, 2008

Related U.S. Application Data

(60) Provisional application No. 60/846,686, filed on Sep. 22, 2006, provisional application No. 60/928,909, filed on May 11, 2007.

(51) Int. Cl.
*G01B 5/00* (2006.01)

(52) U.S. Cl. .......................... 33/288; 33/608

(58) Field of Classification Search ............... 33/288, 33/286, 600, 608, 613, 644, 645, DIG. 1, 33/DIG. 21; 356/139.09
See application file for complete search history.

(56) References Cited

U.S. PATENT DOCUMENTS

| | | | | |
|---|---|---|---|---|
| 3,963,352 A | * | 6/1976 | Rishovd et al. | 356/139.09 |
| 4,134,680 A | * | 1/1979 | Hunter et al. | 356/121 |
| 4,615,618 A | * | 10/1986 | Bailey et al. | 356/139.09 |
| 5,125,164 A | * | 6/1992 | Fournier et al. | 33/608 |
| 6,115,927 A | * | 9/2000 | Hendrix | 33/288 |
| 6,765,664 B2 | * | 7/2004 | Groothuis et al. | 356/155 |
| 6,813,015 B2 | * | 11/2004 | Knoedler et al. | 356/155 |
| 7,120,524 B2 | * | 10/2006 | Srack et al. | 701/33 |

* cited by examiner

*Primary Examiner*—G. Bradley Bennett
*Assistant Examiner*—Tania C Courson

(57) ABSTRACT

The present invention relates to a vehicle measuring apparatus for establishing baselines and dimensionally measuring a vehicle's upper and lower structure, without requiring the use of a fix mechanical grid mechanism. A method is presented which includes having a pre calibrated portable gauge (52) placed to a selected point on the vehicle with a squaring device (66) on gauge (52) positioned outwardly of the vehicle and having a light source (20) placed on or in proximity to the vehicle for projecting a plane of light (90 or 92) to align to squaring device (66). This alignment establishes a light beam baseline at a predetermined dimensional value with respect to the vehicle. Once the baseline is established measurements of the vehicle's upper or lower body may be determined by placing a portable gauge (52) relative to a point on the vehicle and using squaring device (66) to square the alignment of gauge (52) to the selected baseline.

20 Claims, 14 Drawing Sheets

90
Light beam

92
Light beam

86 — Pinch weld

90 Light beam

92 Light beam

90 Light beam

VEHICLE DIMENSIONAL MEASURING SYSTEM

CROSS-REFERENCE TO RELATED APPLICATION

This application claims the benefits of provisional application No. 60/846,686 filed Sep. 22, 2006 and provisional application No. 60/928,909 file May, 11, 2007

FEDERALLY SPONSORED RESEARCH

Not Applicable

SEQUENCE LISTING OR PROGRAM

Not Applicable

BACKGROUND OF THE INVENTION

1. Field of the Invention

This invention relates generally to a measuring system used to determine dimensional measurements of a vehicle's damaged or undamaged structure such as the body, frame, suspension, or wheels. In one of the preferred embodiments, the invention compares the actual height, length, or width of spatial coordinates of manufacturer-provided control or reference points on a vehicle with their specification or normal value. This may be accomplished through the use of a portable light source such as a laser or camera coupled with a portable gauge and using data provided by the manufacturers of vehicle dimension values.

2. Description of Prior Art

From the past to the present, when performing vehicle collision repair, technicians have relied on a measuring system in conjunction with a frame alignment machine to measure damaged points on the vehicle. To understand the present invention, it is necessary to explain the relationship between prior art measuring systems and the frame alignment machine, since the two works in conjunction with one another.

The technicians use the frame machine to straighten the damaged areas of the vehicle by anchoring the vehicle to the machine and attaching clamps, hooks, chains, or other pulling devices to the damaged areas of the vehicle's body or frame. The frame machine includes one or more movable upright towers. Each tower has a hydraulic cylinder for tightening or loosening a pulling chain. The pulling chain has a hook at one end for connecting the chain to a clamp or other pulling device. By using a measuring system, the technician sets the towers to pull the damaged areas of the vehicle back to a pre-known specification.

Prior art measuring systems include devices such as lasers, optical sensors, position sensors, cameras, gauges, probes, and pointers. These devices are attached to complex fixed mechanical grid mechanisms that include an assembly of mechanical trammel fixtures such as a jig of vertical and horizontal bars, rails, or bridges built about the vehicle. These devices are currently used in prior art for upper and/or lower body coordinate measuring and can be coupled with vehicle specifications provided by the manufacturers of vehicle dimensional data. By coupling these devices with a computer an operator can determine which areas of the vehicle are damaged, display computer graphics, and print illustrated reports.

Prior art measuring systems can be divided into eight categories: (1) universal measuring; (2) universal laser; (3) dedicated fixture; (4); gauge measuring; (5) ultrasonic; (6) CMM (coordinate measuring machine); (7) computerized laser; (8) cameras such as CCD (charged coupled devices).

(1) Universal measuring systems use longitudinal ladder type rails which are centered beneath the vehicle. Crossbars connect the rails together and have vertical pointers which are adjusted to various points along the bottom of the vehicle. At least three of these points are located in the torque box areas of the vehicle and are used for centering the rails to the vehicle. A measuring tape is provided along the edge of each rail to measure a length on each side of the vehicle. A width measurement of each point is read on the crossbar and a height measurement is read on the vertical pointer. The points on the bottom of vehicle are compared to a dimension data sheet for determining vehicle misalignment. However, these systems consist of a constructed fixed mechanical grid mechanism such as a jig of vertical and horizontal bars, rails, or bridges built about the vehicle. These fixtures hold pointers for checking the upper strut towers and other body or frame points. The assembly is time consuming and often in the way of the technician or in the way of blocks, chains, and other anchoring or pulling devices used during body or frame realignment. An example of a universal measuring system is seen in U.S. Pat. No. 4,731,936 to Aldrich, 1988 and U.S. Pat. No. 4,442,608 to Clausen, 1984.

(2) Universal laser measuring systems consist of one or more lasers mounted on assembled ladder type rails which are centered beneath or to the outer side of the vehicle. These devices are used to determine a vehicle's datum or centerline and places the laser at a path parallel or perpendicular to the centerline. Length measurements are provided by a measuring tape attached to a longitudinal rail and moving the laser longitudinally along the rail from one point to another. Height measurements are provided by using an assembled upright post having a vertical measuring scale and placing the laser on the post. Comparative side to side measurements are provided by an elongated target that has a measuring scale or a handheld device such as a conventional measuring tape placed laterally outward against the vehicle's body or frame. The laser's beam strikes the scale on the target. Measurements are determined from the location point on the vehicle to the laser beam. However, in order to measure a vehicle these systems require the use of a fixed mechanical grid mechanism. The mechanism includes an assembly of mechanical fixtures such as a jig of vertical and horizontal bars, rails, or bridges built about the vehicle. These fixtures hold pointers or lasers for checking the upper strut towers and other body or frame points. The assembly is often in the way of the technician or in the way of blocks, chains, and other anchoring or pulling devices used during body or frame realignment. An example of a universal laser system is seen in U.S. Pat. No. 5,644,854 to Bergeron, 1997; U.S. Pat. No. 5,515,613 to Hinson, 1996; and U.S. Pat. No. 4,663,855 to Hamilton, 1987.

(3) Dedicated fixture consist of fixtures which hold the vehicle to the frame machine at specific control points such as shock towers, cross-members, end of the frame rails, etc. Damaged areas of the vehicle are pulled and realigned and a fixture is placed under each particular area and bolted to the frame machine. This ensures that each particular damaged point on the vehicle is correctly aligned to the manufacture's specifications. However, this type system requires time consuming removal of suspension and other components in order to mount fixtures. An example of a dedicated fixture system is seen in U.S. Pat. No. 4,534,200 to Celette, 1985.

(4) Gauge measuring consists of trammels or centerline gauges. Trammels are used for point to point measuring. Centerline gauges attach to the vehicle's underbody. These devices are often in the way during frame realignment and require an assembly of vertical and horizontal bars when measuring the vehicle's upper body in relation to the lower body or frame. An example of gauge measuring is seen in U.S. Pat. No. 5,647,139 to Richardson, 1997.

(5) An ultrasonic device use probes placed at specific points on the vehicle to generate signals which are sent to a central beam positioned longitudinally beneath the vehicle. Data is sent from the beam to a computer which compares the vehicle's actual measurements to known OEM dimensions and a printout of dimensions is provided. However, this system uses time consuming fixtures placed about the vehicle. These fixtures hold emitters which generate acoustic signals for checking the upper strut towers and other body points. These fixtures are often in the way of the technician or in the way of blocks, chains, and other anchoring or pulling devices used during body or frame realignment. An example of an ultrasonic measuring system is seen in U.S. Pat. No. 4,811,250 to Steber, 1989. An example of an upper body mounting fixture for this device is seen in U.S. Pat. No. 5,493,925 to Liegel, 1996.

(6) CMM (coordinate measuring machines) consists of a mechanical arm on a measuring unit placed to the outer side of a vehicle or on a ladder type track underneath the vehicle. A probe is attached to the arm. Once the system is positioned, points on the vehicle can be measured for height, length, and width. Various attachments to the arm enable the arm to measure upper body locations. Data is transferred to a computer for analysis and documentation. However, these systems require maneuvering the arm around many objects such as blocks, chains, frame machine towers, or other hookups used during body or frame realignment. Often chains, blocks, and other hookups must be removed from the work area in order to measure realigned areas. An example of a coordinate measuring machine is seen in U.S. Pat. No. 6,366,831 to Raab, 2002.

Other CMM use a rail placed or bolted along each side of the frame machine. Upright tubular towers support mechanical measuring arms. The towers move longitudinally along the rail for length measurements, the arms move vertically on the towers for height measurements, and the arms move perpendicular to the rail for width measurements. However, the towers and measuring arms are often in the way during a frame alignment procedure and must be removed from the work area in order to place chains and other hookups to the vehicle. Once the damaged area is realigned, the chains and other hookups are removed from the vehicle and the measuring arm is placed back to the point being measured. This process is often repeated several times before realignment is complete. An example of this type CMM can be seen in U.S. Pat. No. 5,341,575 to Chisum.

(7) Computerized laser systems use a laser beam generator placed under the vehicle and a series of flags or targets are placed at selected reference points on the vehicle. The laser determines triangulated measurements of height, length, and width and the dimensions are transmitted to a computer and compared to stored OEM dimensions. A printout is provided illustrating vehicle measurements. However, in order to measure a vehicle's upper body in relation to the lower body or frame these systems use time consuming series of flags, targets, or fixtures placed about the vehicle which are often in the way of blocks, chains, and other anchoring or pulling devices used during body or frame realignment. An example of a computerized laser system is seen in U.S. Pat. No. 4,997,283 to Danielson, 1991; U.S. Pat. No. 6,765,664 to Groothuis, 2004; and U.S. Pat. No. 5,029,397 to Palombi, 1991.

(8) Camera systems use time of flight technology, reference emitters, electromagnetic radiation-emitting probes, and a computer. The camera senses the location of at least three emitters which are attached to points on a vehicle. The camera must see all three emitters from the same camera position in order for the computer to triangulate the locations of the emitters and establish a reference frame. The emitter locations are then put onto a standard coordinate system. The computer compares the emitter locations to data for the type of vehicle being measured and determines the extent of deviation of measured points on the vehicle. However, this system requires at least three emitters placed at specific points on the vehicle by an assortment of clip attachments. Then to measure additional points on the vehicle the camera must see all three emitters from the same camera position. A handheld emitter is included to touch additional points so that calculations are made and coordinates are determined. If the camera can not see all three emitters from the same position it is necessary to move the camera to a new location. This can be tiring to a technician, since there are many obstacles around the vehicle and frame machine during body or frame realignment, such as frame machine towers, chains, blocks, etc. An example of a camera system is seen in U.S. Pat. No. 6,115,927 to Hendrix, 2000.

Another camera system uses a track beneath the vehicle. CCD cameras travel along the track using two cameras to triangulate and take measurements along the bottom of the vehicle. However, in order to measure a vehicle's upper body this system uses a time consuming fixed mechanical grid mechanism such as a jig of vertical and horizontal bars, rail, or bridge built around the vehicle, which hold additional CCD cameras for checking the upper strut towers and other body points. This assembly is often in the way of the technician or in the way of blocks, chains, and other anchoring or pulling devices used during body or frame realignment. An example of this CCD system is seen in U.S. Pat. No. 7,120,524 to Srack, 2006.

Conclusion to Prior Art

After observing prior art vehicle measuring systems it becomes apparent that there is still a need to have a system that may be used for dimensionally measuring a vehicle's upper and lower structure, which does not require the use of time consuming fixtures or mechanical grid mechanisms such as previously described.

THE INVENTION

Objective

Accordingly, the objective of the present invention is:

To provide a vehicle measuring system for quickly establishing one or more baselines used to measure one, two, or three dimensional measurements of points on a vehicle's upper and/or lower body according to a coordinate system, without requiring the use of fixtures or mechanical grid mechanisms, such as currently used in prior art.

BRIEF SUMMARY OF THE INVENTION

In a principal aspect, the present invention is a system for establishing baselines and checking dimensional values or coordinates of points located on a vehicle. These points are relative to the vehicle's upper, lower, inner, and outer structure and include the body, frame, suspension and wheels.

One of the main devices of the present invention is from my first provisional application, No. 60/846,686 filed Sep. 22, 2006, which includes a portable light source device having at least one light source selected from a CCD or CMOS camera using time of flight principles or a laser for generating a longitudinally vertical plane of light and/or a horizontal plane of light. The portable light source device includes a light source mounted relative to an arm pivotally connected to a rotatable base, which makes the light source easy to place and position relative to the vehicle.

The light source device may include an arm having a base or support for placing the arm on or in proximity to a vehicle. The arm may have a mount for mounting a light source relative to the arm. The light source mount may include a pivot connection relative to the arm for positioning the light source mount in a level orientation regardless of the angle of the arm. The arm may include a pivot connection at the base for rotating the arm. The light source mount may further include a pivot connection which allows the light source to rotate in a horizontal plane on the light source mount while the arm is simultaneously rotated in the same or opposite direction of the light source without eliminating the level orientation of the light source. The base may further have a pivotal connection for raising or lowering the elevation of the light source in relation to the base.

The present invention further includes a portable elongated measuring gauge used in conjunction with the portable light source device. The portable gauge is from my second provisional application, No. 60/928,909 filed May 11, 2007. The portable gauge may include a bar having a linear measuring scale lengthwise of the bar, a pointer having a linear measuring scale lengthwise of the pointer, a leveling device, and a positioning or squaring device located on the gauge which may have a perpendicular shaped body with opposite sighting ends. The squaring device may be used for establishing a perpendicular alignment between the portable elongated gauge a longitudinal vertical plane of light emitted from the light source device or a parallel alignment between the gauge and a horizontal plane of light. This may be accomplished when the light source device is placed on or in proximity to the vehicle and one or more light beams projected; and the potable elongated gauge placed relative to a point on the vehicle and positioned using the squaring device to align the gauge to at least one of the light beams. The alignment between the gauge and light beam may be used for setting up baselines and determining measurements between the baselines and points located on the vehicle's upper and/or lower structure. The measurements may include a coordinate or value representative of a horizontal distance between the vehicle's centerline and a baseline parallel to the centerline or a vertical distance between a horizontal baseline and a point on vehicle's lower body. Electronic devices may be attached to the squaring device and/or pointer. The electronic devices may be used for measuring a height, length or width measurement of at least one point located on the vehicle and for transferring the measured value to a computer for storing, arranging measurements, displaying graphics, or printing reports. The light source may include a laser or camera for determining a length dimension relative to points on the vehicle by using distance measuring principles.

The invention may further include an alternative portable gauge such as a linear measuring unit from my first provisional application, No. 60/846,686 filed Sep. 22, 2006. This unit can be used manually or with electronic measuring devices. A manual version may consist of a laser placed between two measuring tapes with sights for squaring the unit to a laser baseline.

DETAILED DESCRIPTION OF THE PREFERRED EMBODIMENTS

Figure 2:
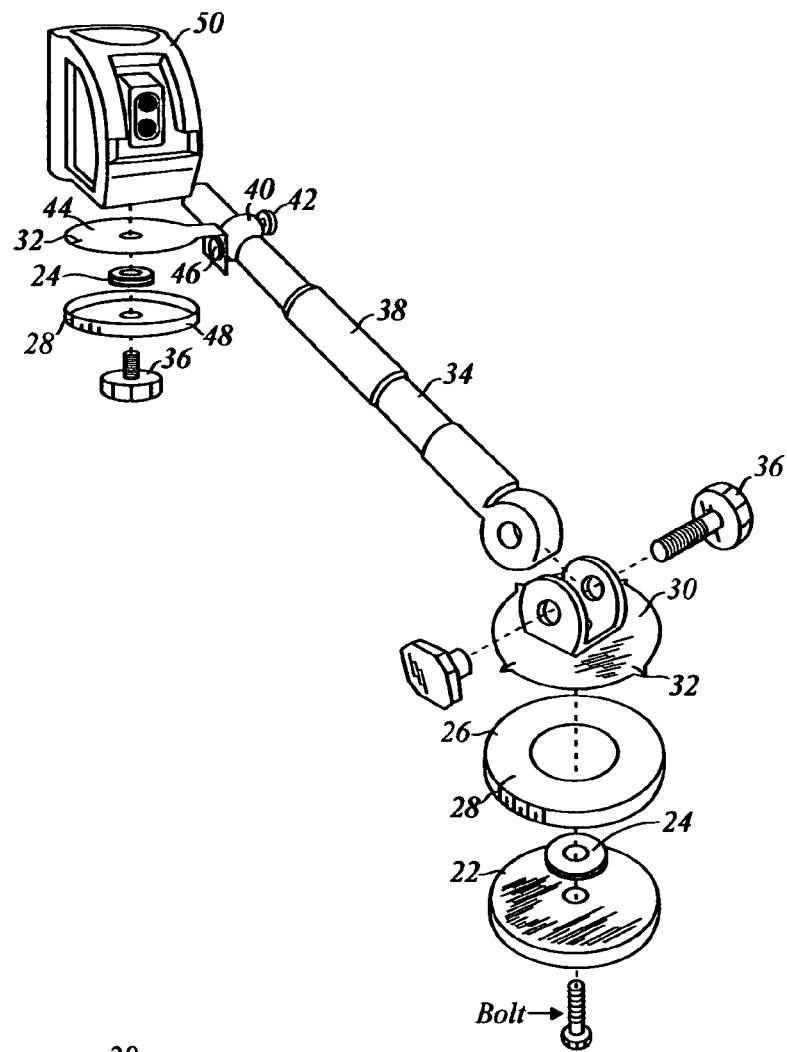
FIG. 2 shows an exploded view of a portable mounting support with a light source.

FIG. 2 shows an exploded view of a portable light source device which includes a lower magnetic base 22 and a rotatable base cover 26. Bearing 24 is positioned inside base cover 26 and connects magnetic base 22 and swivel joint 30 through a hole in base cover 26. Base cover 26 may include graduation mark 28, which may be detected by indicator mark 32 seen on swivel joint 30. An arm 34 is attached to swivel joint 30 for pivotally raising or lowering the arm and is secured by set knob 36 which is used for holding tension between swivel joint 30 and arm 34. Arm 34 may be fixed or telescoping. A handgrip 38 may be used for handling or carrying portable light source device 20. A set collar 40 slides over one end of arm 34 and is secured by set knob 42. Set collar 40 supports a pivotal mounting bracket 44 and is secured by bolt 46. Mounting bracket 44 supports rotatable dial 48. Dial 48 may include graduation mark 28, which may be detected by indicator mark 32 located on bracket 44 and used for rotatable positioning of light source 50 which is attached to mounting bracket 44.

Figure 2A:
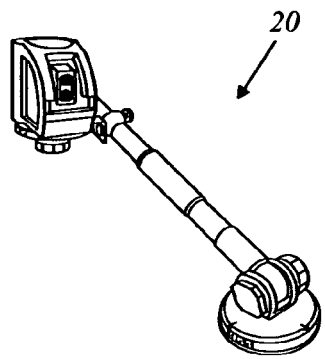
FIG. 2A shows the fully assembled portable light source device seen in FIG. 2.

FIG. 2A shows light source 50 and the mounting support seen in FIG. 2 fully assembled as light source device 20.

Figure 3:
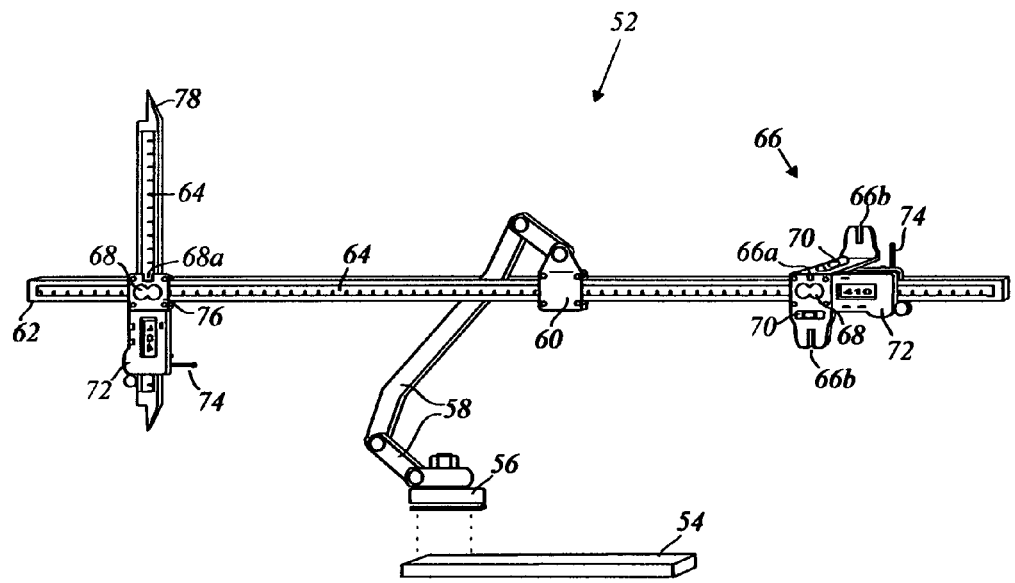
FIG. 3 shows the portable gauge having measuring scales of coordinate axes, attached electronic devices for communicating with a computer, and an articulated arm with a magnetic base removably attached to a base plate for supporting the gauge.

FIG. 3 shows a portable gauge 52, which includes a bar 62 having a measuring scale 64, a removable bar mount 60, which connects an articulated arm 58, which connects a magnet 56, which connects to a removable base plate 54. Bar 62 is shown having an adjustable pointer mount 76 with a viewing window 68, a marker or datum notch 68a, an electronic measuring device 72, and antenna 74. Pointer mount 76 supports an adjustable pointer 78 having a measuring scale 64. Pointer 78 may include a tip with a flat central side for locating a point on the vehicle with respect to an edge of a surface. Squaring device 66 is shown connected to bar 62 and is shown having a viewing window 68, leveling devices 70 according to earth's gravity, a marker or datum notch 66a, sights 66b, electronic measuring device 72, and antenna 74. Squaring device 66 may have a longitudinal body with opposite perpendicular sighting ends 66b and may be adjustably attached to bar 62 for aligning an orientation of bar 62 to baseline of light 90, 92, or 92a (see FIGS. 3, 5A, and 13).

Figure 3A:
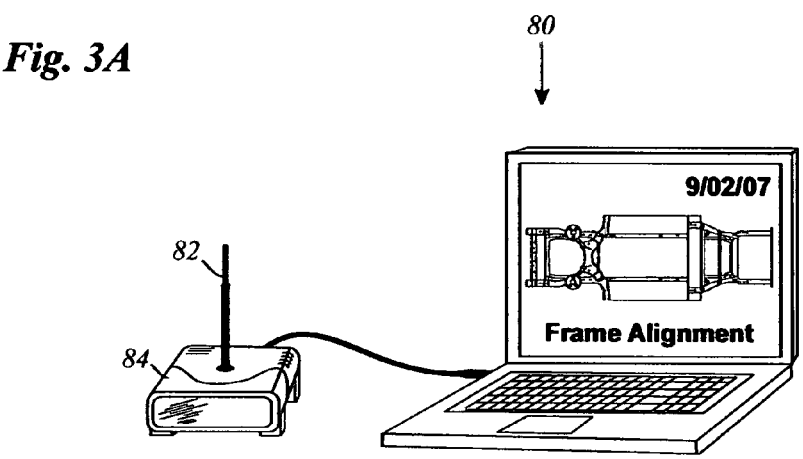
FIG. 3A shows a receiver and a computer for processing wireless signals received from the portable gauge seen in FIG. 3.

FIG. 3A shows a computer 80, a receiver 84, and an antenna 82.

Figure 4:
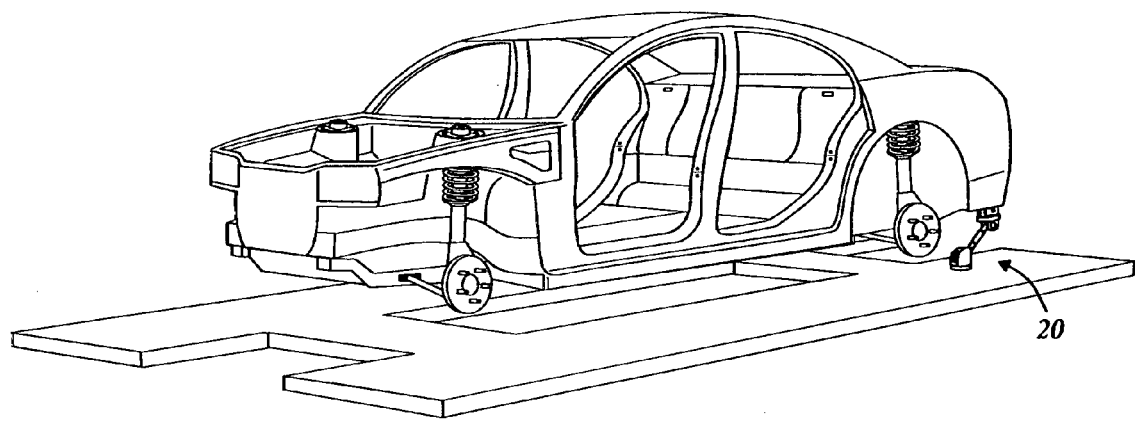
FIG. 4 shows a portable light source device attached to the lower body of the vehicle, which may be used for establishing baselines and/or determining length measurements.
Figure 4A:
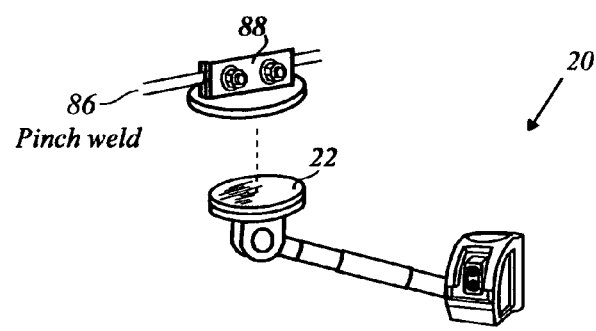
FIG. 4A shows a clamp plate which bolts to the vehicle's pinch weld for attaching the portable light source device seen in FIG. 4.

FIG. 4A shows a clamp plate 88 bolted to a vehicle's pinchweld 86, which connects portable light source device 20 to the vehicle.

Figure 7:
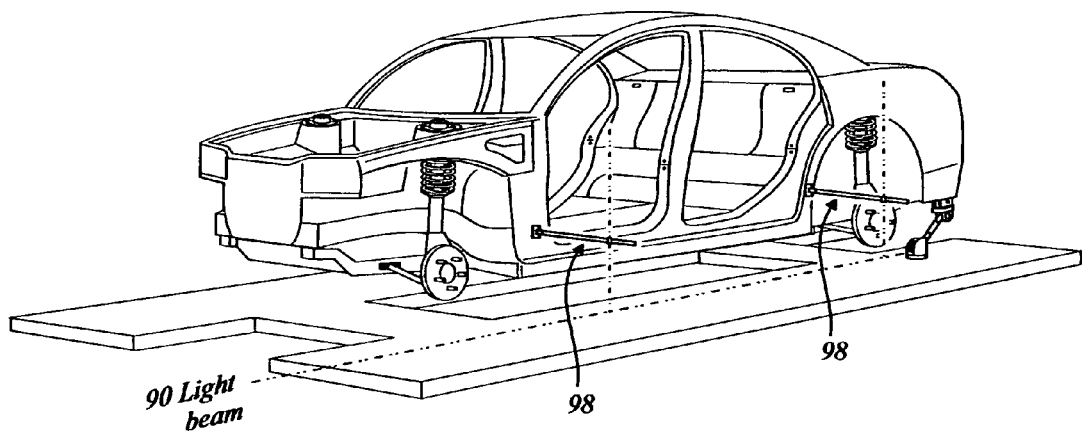
FIG. 7 shows the gauges seen in FIG. 6 removed and two pivotal targets placed horizontally to the side of the vehicle and intersecting the baseline of light.
Figure 7A:
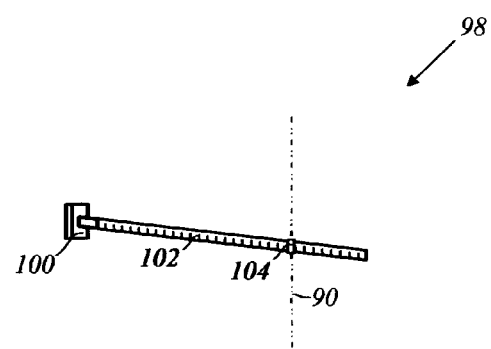
FIG. 7A shows a pivotal target seen FIG. 7 having a marker adjusted to intersect the light beam for maintaining the established baseline of light.

FIG. 7A shows a pivotal target 98 having a magnet base hinge joint 100, graduations 102, and a slidable marker 104 aligned to a light beam 90.

Figure 10:
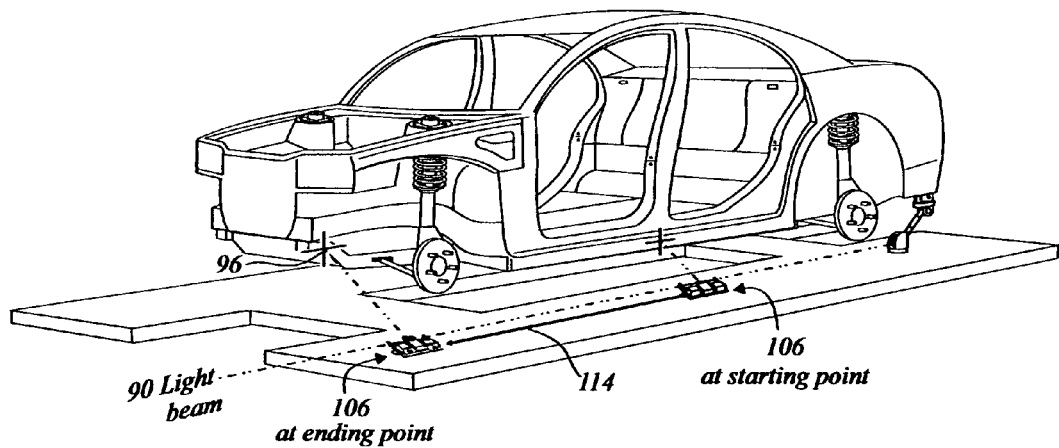
FIG. 10 shows an alternative portable gauge being a linear measuring unit with sights for squaring the unit to a baseline of light.
Figure 10A:
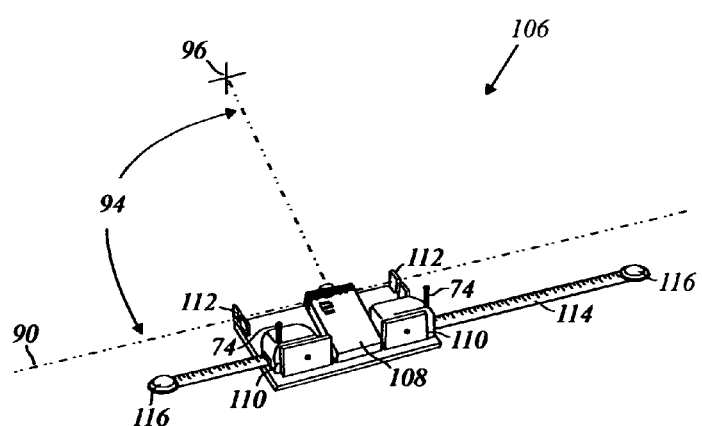
FIG. 10A shows a close up view of the portable measuring unit seen in FIG. 10 aligned to the baseline of light and projecting a light beam perpendicular to the baseline.

FIG. 10A shows a linear measuring unit 106 having a light source 108, measuring devices 110, sighting device 112, at least one measuring device 114, a magnetic tip 116, and an antenna 74. Portable measuring unit 106 may further include electronic transmitting devices such as encoders, electronic measuring tape, or equivalent device for communicating with a receiver and computer for conveying a distance between two points.

Figure 14:
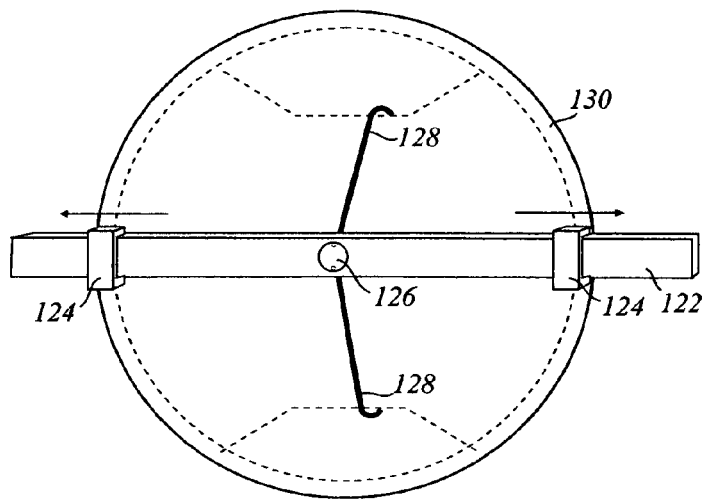
FIG. 14 shows an adaptor used for mounting the squaring device to a vehicle's wheel.

FIG. 14 shows an adaptor 122 attached to vehicle's wheel having a slidable brace 124, plate 126, and straps 128. Adaptor 122 with slidable braces 124 is placed against the outer edge of wheel 130 and connected to the wheel using straps 128.

Figure 14A:
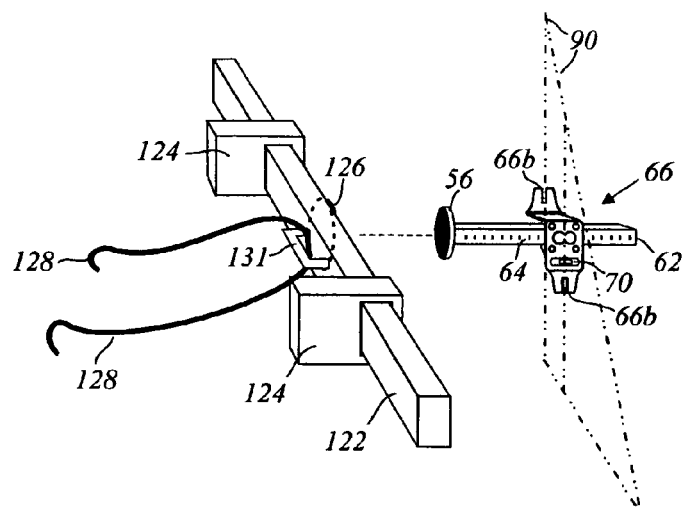
FIG. 14A shows a perspective view of the adaptor and squaring device shown in FIG. 14.

FIG. 14A shows a perspective view of a wheel alignment device used in conjunction with one of the light beams. The alignment device may include an adaptor member 122, slidable braces 124, straps 128, and a connector 131 for holding the strap to member 122. A squaring device 66 is shown with leveling device 70 and sights 66b and may be slidably connected to a bar 62. Bar 62 having measuring scale 64 may be attached to a magnet 56. Magnet 56 may be removably attached to plate 126. Member 122 and squaring device 66 are used for determining a wheel's vertical and parallel position relative to the vehicle's centerline.

Baseline Setup and Operation

For the proposes of this section the baseline established in proximity to the vehicle by projecting light beam 90 will be referred to as (baseline 90) and the baseline established by projecting light beam 92 will be referred to as (baseline 92).

In one aspect it is necessary to set up a baseline in a horizontal plane below the vehicle which is perpendicular to the vehicle's centerline (seen in FIGS. 1 and 12). The baseline is used for checking actual height dimensional values of various points on the vehicle's upper and/or lower structure. This may be accomplished using a portable light source device 20 (as seen in FIG. 2A) in conjunction with portable gauge 52 (seen in FIG. 3). Gauge 52 may be set or calibrated to a specific predetermined height dimensional value relative to an undamaged pre-selected point on the vehicle. This value may be specified using data provided by the manufacturers of vehicle dimension values. The value may be set by adjusting pointer 78 perpendicular to bar 62 of portable gauge 52 (see FIG. 3) until scale 64 representing the selected height value is aligned to datum marker 68a on pointer mount 76 or using electronic device 72 for viewing the height value.

Figure 5:
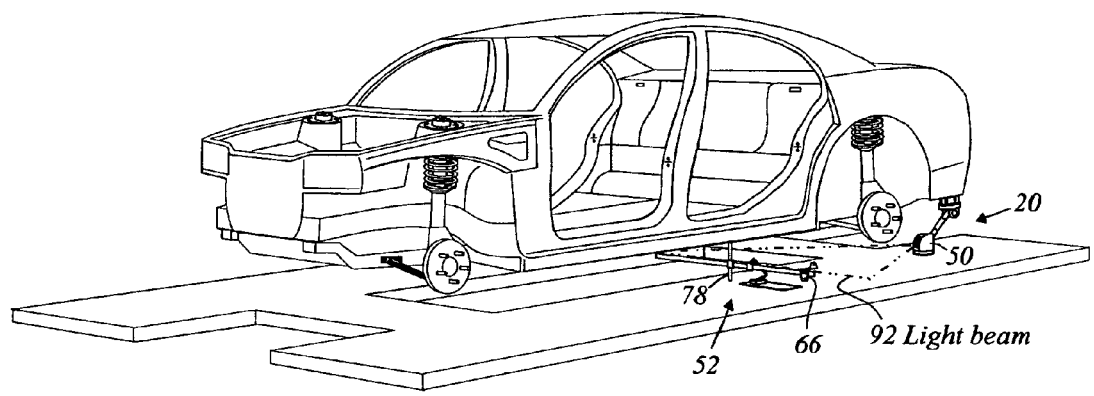
FIG. 5 shows a pointer and a squaring device attached to a portable gauge for establishing an alignment between the vehicle, portable gauge, and a horizontal light beam projected below the vehicle.
Figure 5A:
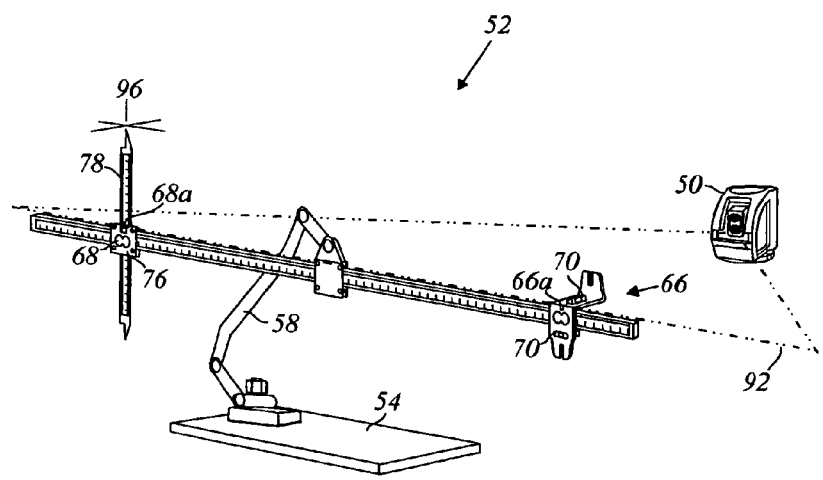
FIG. 5A shows a close up view of the alignment between the portable gauge and light beam seen in FIG. 5.

Portable gauge 52 is shown in FIGS. 5 and 5A placed on the frame machine, floor, or other surface below the vehicle using articulated arm 58 on base plate 54. Pointer 78 on gauge 52 is placed to the preselected point on the vehicle (such as point 96) and squaring device 66 on gauge 52 is used a target positioned outwardly of the vehicle. Gauge 52 may be leveled horizontally using leveling device 70. Another leveling device 70 may be used for positioning pointer 78 vertically relative to the preselected point. Both leveling devices 70 may be located on squaring device 66. Once gauge 52 is leveled, datum marker 68a on pointer mount 76 will be on the same horizontal plane as datum marker 66a located on squaring device 66.

Portable light source device 20 may be place on or in proximity to the vehicle. FIG. 4 shows the light source attached to the vehicle's lower body, which may further include attaching a clamp plate 88 to vehicle pinchweld 86 and magnetically attaching light source device 20 to clamp plate 88 using magnetic base 22 (seen in FIG. 4A). FIG. 12 shows light source device 20 placed on a surface below the vehicle. Light source device 20 may be used for projecting a horizontal light beam 92 below the vehicle. The light source may be adjusted up or down until horizontal light beam 92 is aligned, intersects, or in communication with marker 66a of squaring device 66 (see FIG. 5A). Aligning light beam 92 to marker 66a is beneficial, since marker 68a at pointer mount 76 may be located under the vehicle and hidden from the view of light beam 92. This alignment confirms that light beam 92 is now aligned to the height value set at marker 68a, whereby light beam 92 is now established as baseline 92. The baseline includes a horizontal plane of light positioned below the vehicle which is accessible outwardly of the vehicle and may be used for determining upper and lower body measurements along the entire length of the vehicle.

Once baseline 92 is established it is possible to determine actual height dimensional measurements or values representing the location of points on the vehicle's upper and lower structure, according to a coordinate system. This may be accomplished (as seen in FIGS. 5 and 5A) by placing pointer 78 of portable gauge 52 with respect to a point on the vehicle with squaring device 66 positioned outwardly of the vehicle. Gauge 52 is adjusted and leveled according to leveling devices 70 and positioned until squaring device 66 is aligned to baseline 92. A height measurement is determined by scale 64 of pointer 78 and may be viewed at marker 68a of pointer mount 76 and confirmed when marker 66a of squaring device 66 and marker 68a of pointer mount 76 are aligned to the same horizontal plane according to baseline 92.

Figure 1:
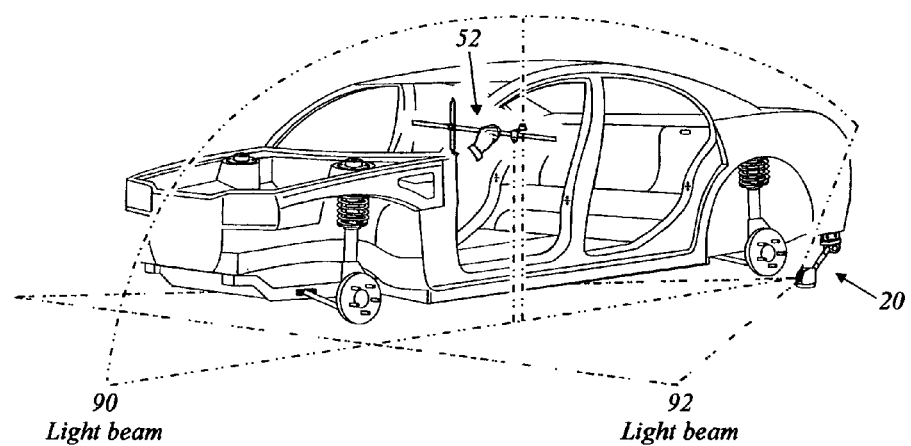
FIG. 1 shows a longitudinal vertical plane of light aligned parallel to the vehicle's centerline, a horizontal plane of light positioned below the vehicle, and a portable measuring gauge placed in an operative position for measuring a point on the vehicle.
Figure 12:
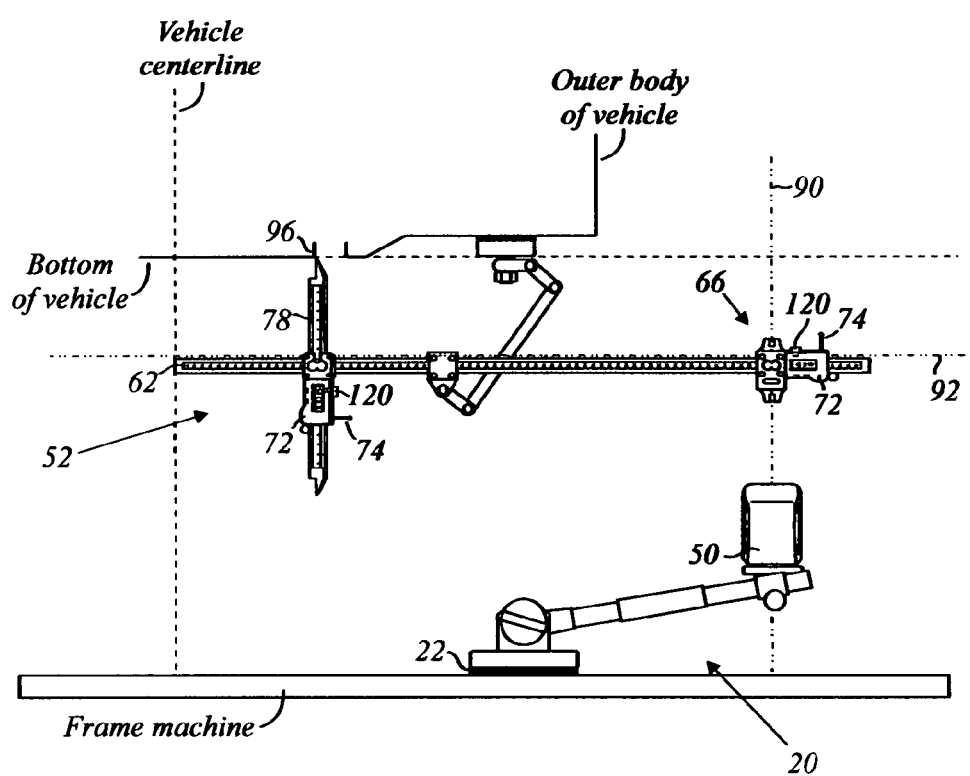
FIG. 12 shows a portable gauge coupled with electronic digital devices and in an operable position for measuring a vehicle.

In another aspect it is necessary to setup a baseline which includes a longitudinal vertical plane of light projected parallel to the vehicle's centerline (seen in FIGS. 1 and 12). This baseline is used for checking actual width dimensional values of various points on the vehicle's upper and/or lower structure. Establishing the baseline may include selecting two undamaged points on the vehicle and calibrating two portable gauges 52 according to predetermined width dimensional values of the selected points. The values may be specified by data provided by the manufacturers of vehicle dimension values. Gauge 52 may be calibrated by sliding pointer 78 along scale 64 on bar 62 of first gauge 52 to the specified width value of one of the selected undamaged points. The value may be viewed relative to the gauge in viewing window 68 of pointer mount 76 (see FIG. 3). Second gauge 52 may be adjusted in the same manner according to a specific predetermined width dimensional value of the other selected undamaged point.

Figure 6:
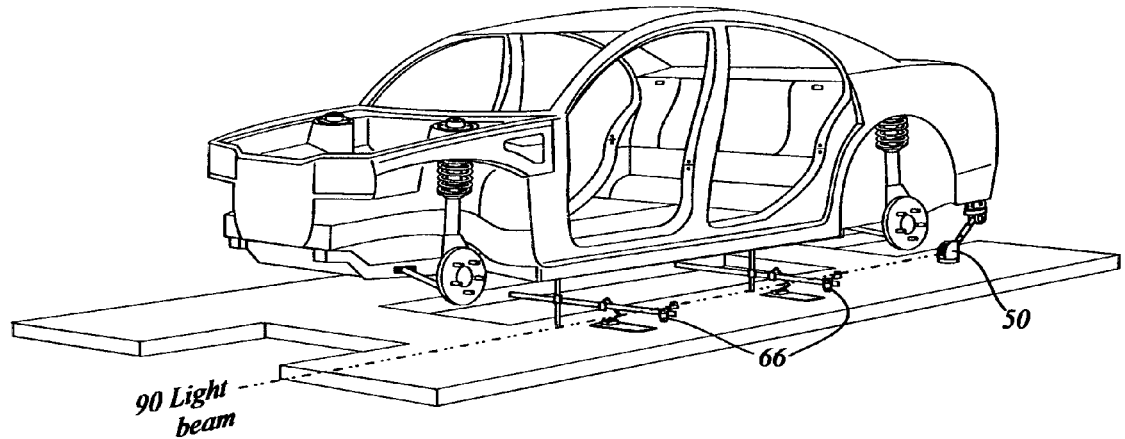
FIG. 6 shows two portable gauges placed relative to the vehicle, each having an attached squaring device for receiving a light beam projected from a light source attached to the vehicle, wherein a baseline of light is established parallel to the vehicle's centerline.

In FIG. 6 both portable gauges 52 are shown placed below the vehicle on a frame machine, floor or other surface and positioned substantially perpendicular to the vehicle's centerline. Each gauge may be supported using articulated arm 58 on base plate 54 (as illustrated in FIG. 5A). Each portable gauge 52 being calibrated with respect to a selected point may be placed with pointer 78 relative to the point on the vehicle and squaring device 66 positioned outwardly of the vehicle. Squaring device 66 on each gauge is adjusted to an equal selected value along scale 64 on bar 62 of gauge 52 (see FIG. 3). This value will automatically represent a distance perpendicular to the vehicle's centerline. Leveling devices 70 are used for leveling the gauge and positioning the pointer vertically. The leveling devices may be located on squaring device 66 (seen in FIG. 5A).

When placing the gauges to the vehicle, only one pointer 78 is set according to a correct datum height setting of its appointed control point. Pointer 78 on the other gauge 52 is set at a higher or lower setting. This is done in order to set one gauge higher than the other to ensue that both gauges 52 will be seen by light beam 90 which will be aligned parallel to a vehicle's centerline (seen in FIG. 12), light beam 92 which will be aligned horizontally below the vehicle and perpendicular to the vehicle's centerline (seen in FIG. 12), or light beam 92a which is radiated from a CCD or equivalent light source (seen in FIG. 13).

Figure 6A:
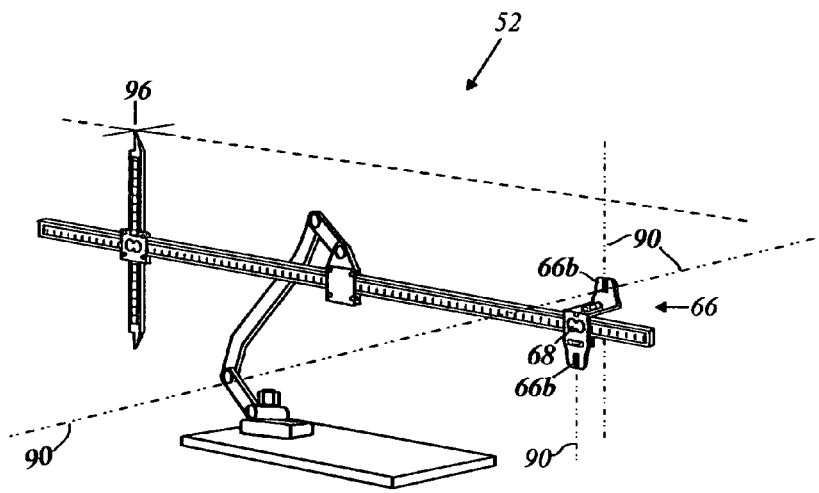
FIG. 6A shows a close up view of the alignment between the portable gauge and baseline of light seen in FIG. 6.

Light source device 20 being placed on or in proximity to the vehicle (as seen in FIGS. 4 and 12) may be used for projecting light beam 90 as a longitudinal vertical plane of light (seen in FIGS. 1 and 12). Light beam 90 may be directed to align squarely to each squaring device 66. Either squaring device 66 and/or light beam 90 may be slightly adjusted until light beam 90 passes through sighting ends 66b located on each squaring device 66 (see FIG. 6A). This alignment brings light beam 90 to a precise parallel alignment relative to the vehicle's centerline and aligns portable gauge 52 perpendicular to the vehicle's centerline, whereby light beam 90 is now established as baseline 90, which includes a vertical plane of light outwardly of the vehicle paralleling the vehicle's centerline at a specific predetermined dimensional value. This baseline may be used for determining width dimensional values relative to points along the entire length of the vehicle's upper and lower body.

Once baseline 90 is established it is possible to determine actual width dimensional measurements or values representing the location of points on the vehicle's upper and lower structure, according to a coordinate system. This may be accomplished by placing portable gauge 52 or pointer 78 of portable gauge 52 with respect to a point located on the vehicle, adjusting and leveling gauge 52 according to leveling devices 70, and aligning squaring device 66 squarely to baseline 90 (see FIGS. 9 and 9A). Measurements may be read at viewing window 68 of pointer mount 76 and/or viewing window 68 of squaring device 66. Measurements are based on the position of the established baseline.

Measurements may also be determined using gauge 52 without pointer 78. For example, bar 62 of gauge 52 may be placed with respect to a point on the vehicle with squaring device 66 aligned squarely to either baseline 90 or 92. A measurement relative to the point may be viewed in viewing window 68 of squaring device 66.

Figure 8:
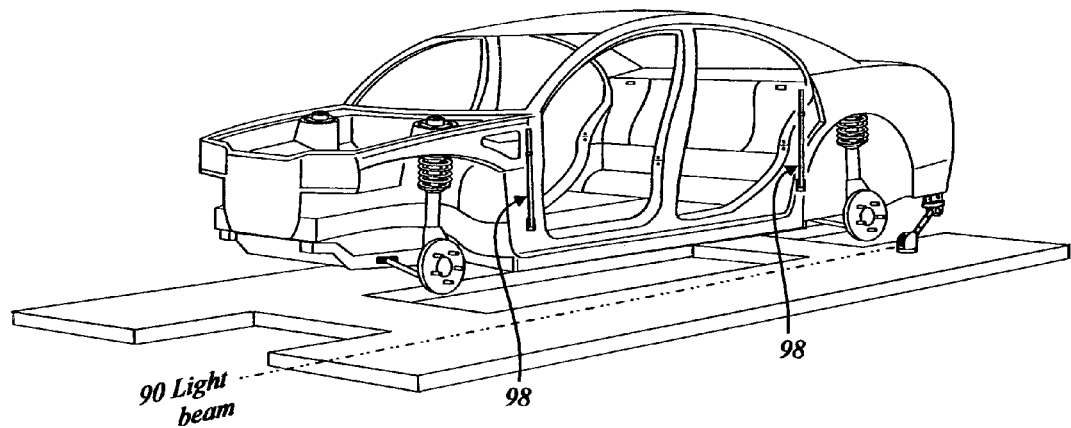
FIG. 8 shows positioning the pivotal targets against the vehicle's body during body and/or frame realignment to eliminate measuring device from the work area of the technician, while still presenting the established baseline along the outer side of the vehicle's body.
Figure 8A:
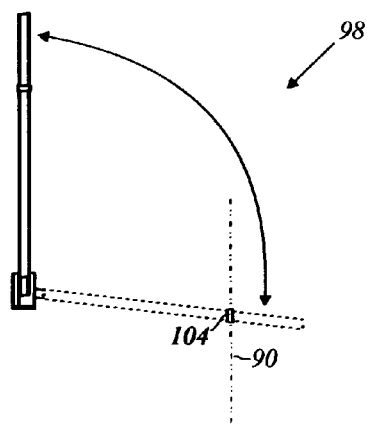
FIG. 8A shows a closer view of the pivotal target seen in FIG. 8 being moved from a horizontal to a substantially vertical position. If for any reason the baseline is redirected from its original position it may be easily re-established by lowering the target to its horizontal position and re aiming the light beam.

In a further aspect, once the baselines are established, FIG. 7 shows the portable gauges removed from the vehicle and targets 98 horizontally attached to the side of the vehicle and marker 104 adjusted along graduations 102 of target 98 until intersecting with light beam baseline 90 (seen in FIG. 7A). This marks the distance between the vehicle centerline and baseline 90 and may be used for maintaining the preset dimensional value of the baseline. Each target 98 may then be pivoted and positioned against the vehicle's body using hinge joint 100 (seen in FIG. 8), thus eliminating any measuring devices positioned around the vehicle which may otherwise be in the way of a technician, blocks, or chains used during vehicle frame realignment, without eliminating the established baseline. If baseline 90 is redirected for any reason, target 98 may quickly be repositioned to its horizontal position and baseline 90 realigned to marker 104 (seen in FIG. 8A), thereby re-establishing the baseline to the preset dimensional value.

Figure 9:
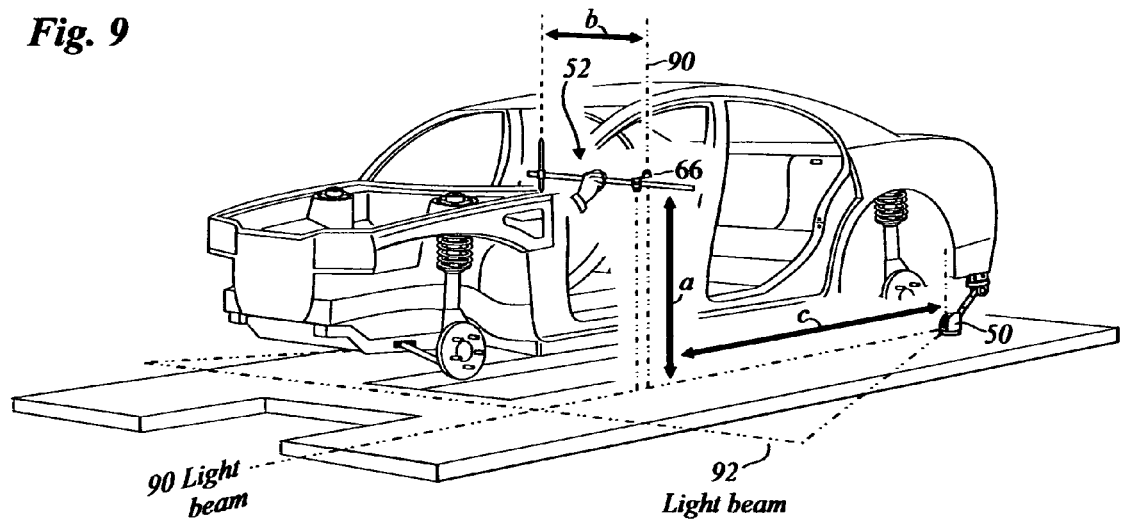
FIG. 9 shows a vertical and horizontal light beam emitted about a vehicle and a portable gauge handheld with respect to a point on the vehicle's upper body and aligned relative to the vertical and horizontal light beams, whereby determining coordinates or values of points on the vehicle's upper body.

In FIG. 9 light source 50 of light source device 20 is shown projecting light beam 90 along the outer side of the vehicle in a plane parallel to the vehicle's centerline and light beam 92 projected in a horizontal plane below the vehicle. The combination light beams may be projected in proximity to the vehicle for establishing a vertical light beam baseline 90 and a horizontal light beam baseline 92. Portable gauge 52 may be handheld relative to a point on the vehicle's upper body with squaring device 66 used for squaring the alignment of gauge 52 to baseline 90 and 92 by an intersection between squaring device 66 and light beam 90. This procedure positions or establishes coordinate axes each time portable gauge 52 is aligned. A height dimension (a) may be determined by the distance between horizontal baseline 92 and either squaring device 66 or gauge 52. A width dimension (b) may be determined using the coordinates relative to the pointer and squaring device 66. A length dimension (c) may be determined by the distance between two points along baseline 90 using light source 50 and squaring device 66.

Figure 9A:
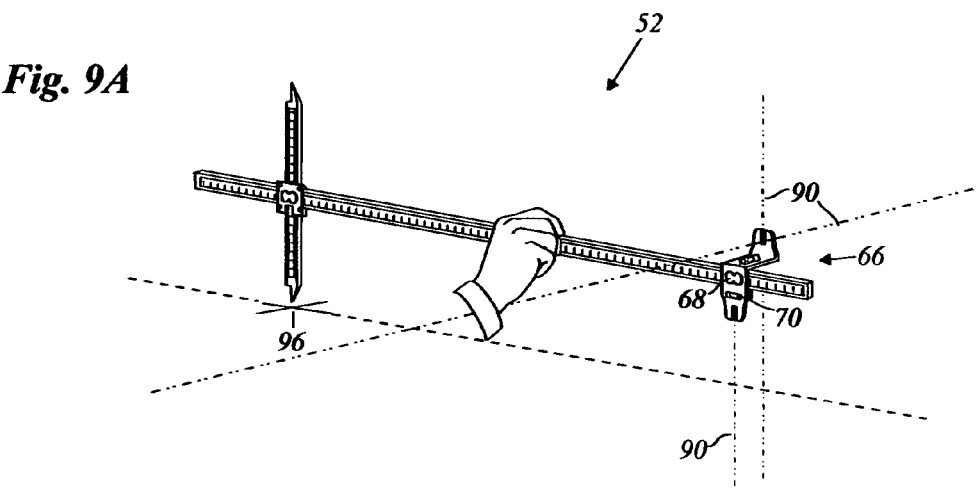
FIG. 9A shows a close up view of a squaring device, on a portable gauge, for establishing an alignment between the portable gauge, point on the vehicle, and light beam seen in FIG. 9.

In FIG. 9A coordinate axes of gauge 52 are shown aligned squarely to baseline 90 using leveling device 70, squaring device 66, and the pointer of gauge 52. Portable gauge 52 may be moved from one point on the vehicle to another along baseline 90 to check dimensional values relative to various points located on the vehicle.

In FIG. 10 a portable linear measuring unit 106 is shown aligned with respect to baseline 90. A light beam from a light source 108 of measuring unit 106 is emitted perpendicular to baseline 90 and aligned to a first starting point on a vehicle. Portable measuring unit 106 is then moved along baseline 90, whereby the light beam from measuring unit 106 is emitted to align to a selected second point on the vehicle. A length measurement 114 is determined by the distance that portable measuring unit 106 traveled along the baseline between the two points and expressed by measuring device 110 or an extension of a measuring tape (see FIG. 10A).

Linear measuring unit 106 may further include a radiation emitter, radiation detector, sensors, position sensor detectors, or equivalent radiation device for communicating measurements, locations, or positions of measuring unit 106 relative to light source 50 using time of flight principles, whereby a starting position of measuring unit 106 and an ending position of measuring unit 106 is detected by the light source and a length between the two points is conveyed to a computer for arranging measurements, illustrating graphics, and printing reports.

Figure 11:
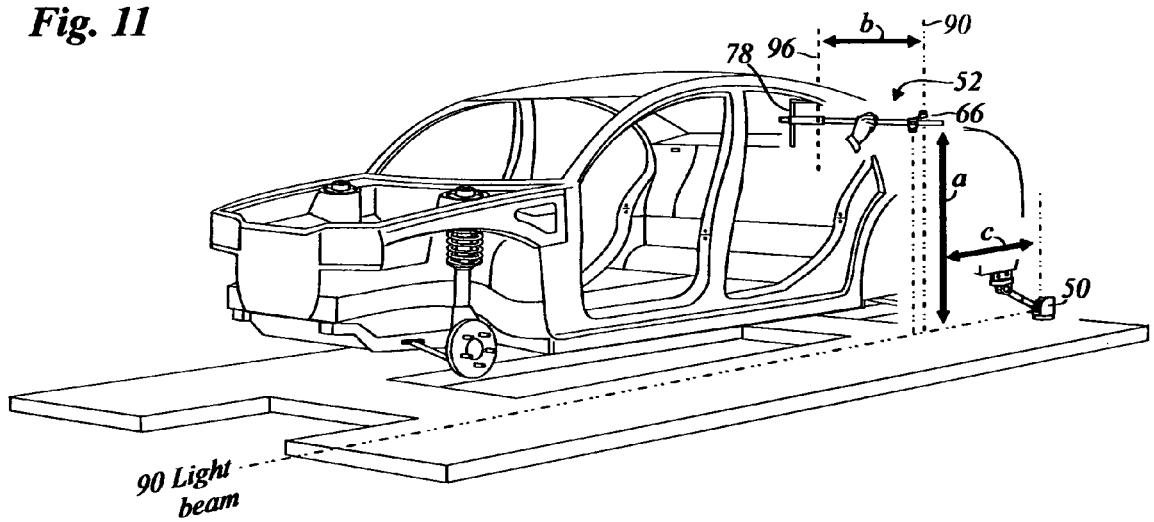
FIG. 11 shows the portable gauge having an L shaped pointer and an elongated pointer mount for reaching and measuring points inside a vehicle's body.
Figure 11A:
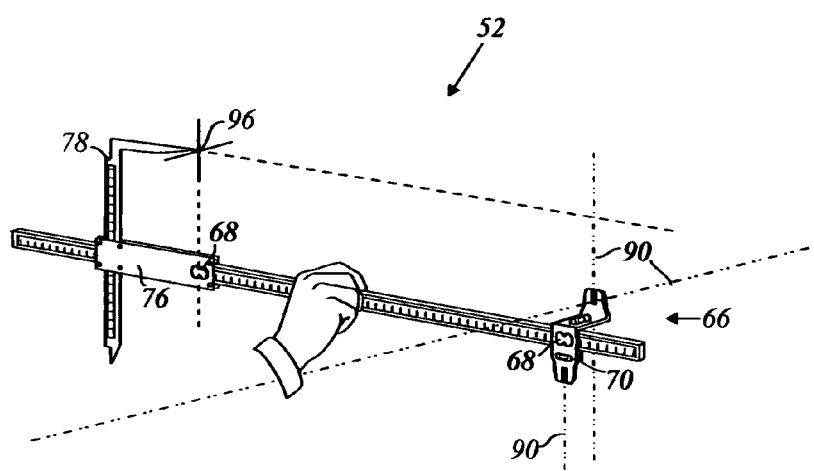
FIG. 11A shows a pointer on the portable gauge seen in FIG. 11 being positioned with respect to a point on the vehicle and a squaring device on the gauge being used for squaring the alignment of the gauge to a light beam.

In FIG. 11 pointer 78 located on handheld portable gauge 52 is shown placed against a reference point 96 located inside the passenger compartment of the vehicle. Gauge 52 is aligned with respect to light beam baseline 90 using squaring device 66. Light source 50 using time of flight principles may be used for communicating with a radiation emitter or other radiation source attached to squaring device 66, whereby a height (a), width (b), and length (c) dimension of reference point 96 may be determined. Portable gauge 52 may be moved from point to point along the vehicle for checking measurements or viewing coordinates of upper and/or lower vehicle structure.

Figure 13:
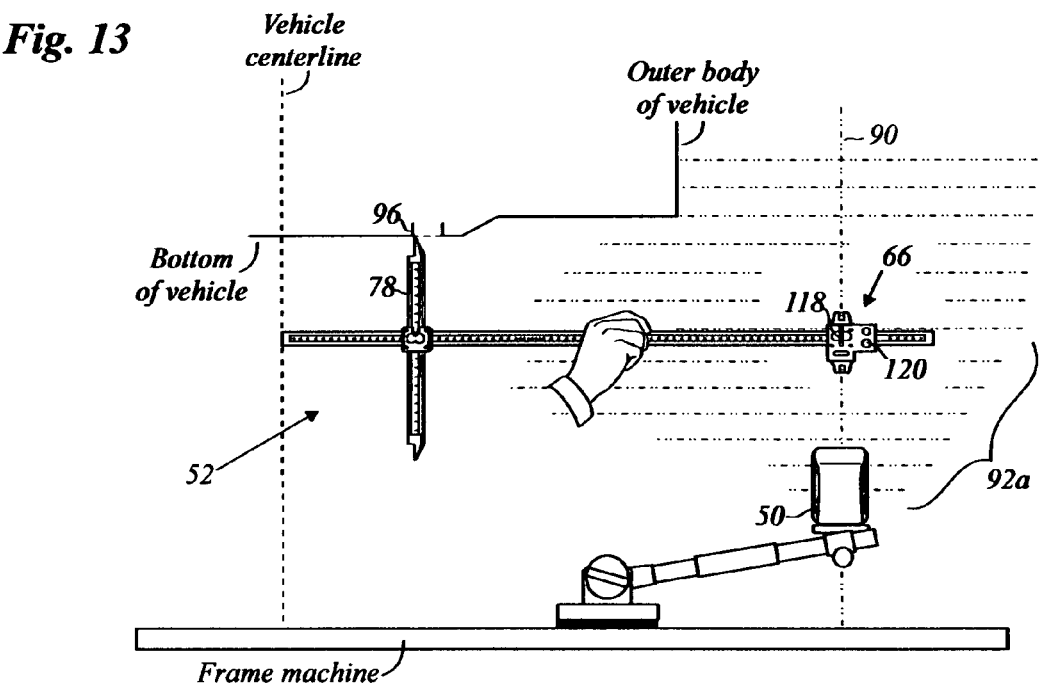
FIG. 13 shows the portable gauge coupled with a radiation emitter or other radiation device attached to the squaring device for communicating a location of the squaring device to a CCD or other modulated light source.

FIGS. 12 and 13 show an example (looking from the rear of a vehicle) of having a portable gauge 52 placed relative to point 96 on the vehicle with squaring device 66 positioned outwardly of the vehicle. Light source device 20 is shown placed outwardly on or in proximity to the vehicle for emitting light beam 90 and/or 92. Squaring device 66 is shown as a target for properly adjusting the alignment between portable gauge 52 and light beam 90 and/or 92 with respect to the vehicle. By positioning at least one portable gauge 52 and at least one light beam in the manner shown, it is possible to have at least one benefit selected from the group consisting of aligning a vertical plane of light in proximity to the vehicle for establishing a light beam baseline 90 along a path parallel to the vehicle's centerline plane, aligning a horizontal plane of light in proximity to the vehicle for establishing a horizontal light beam baseline 92 along a path horizontally perpendicular to the vehicle's centerline plane, determining a measurement of the vehicle along a vertical axis of gauge 52 which is parallel to the vehicle's centerline plane (see pointer 78 vertical relationship to the vehicle centerline), or determining a measurement of the vehicle along a horizontal axis of gauge 52 which is perpendicular to the vehicle's centerline plane (see bar 62 perpendicular relationship to the vehicle centerline), whereby the baselines and measurements relative to the vehicle may be accomplished without requiring the use of a fixed mechanical grid mechanism.

FIG. 12 further shows an example of using electronic digital devices with the present invention. An on/off or automatic switch 120 may be use to activate electronic digital device 72 seen at pointer 78 and seen on squaring device 66. Wireless signals may be transmitted representing a height dimension value through electronic device 72 and antenna 74 at pointer 78 and a width dimension value may be sent through electronic device 72 and antenna 74 on squaring device 66. As described in FIG. 3A, a computer may be used for arrangement of coordinates or measurements, illustrating graphics, and printing reports.

In FIG. 13 portable light source 50 is shown on an articulated support attached to the frame machine and portable gauge 52 being handheld with pointer 78 positioned to point 96 located on the bottom of the vehicle. Squaring device 66 on gauge 52 is shown squared and aligned to the light beam baseline 90 and radiated light 92a. Squaring device 66 may include a radiation emitter or other radiation device 118 for communicating a location of squaring device 66 relative to a CCD or other modulated light source 50. Light source 50 may include distance measuring principles. An on/off switch 120 may be used for activating emitter 118. Light source 50 and/or radiation emitter 118 on squaring device 66 may be used for communicating values to a computer for arranging measurements, illustrating graphics, and printing alignment reports relative to a height, length, or width dimension of point 96.

Figure 13A:
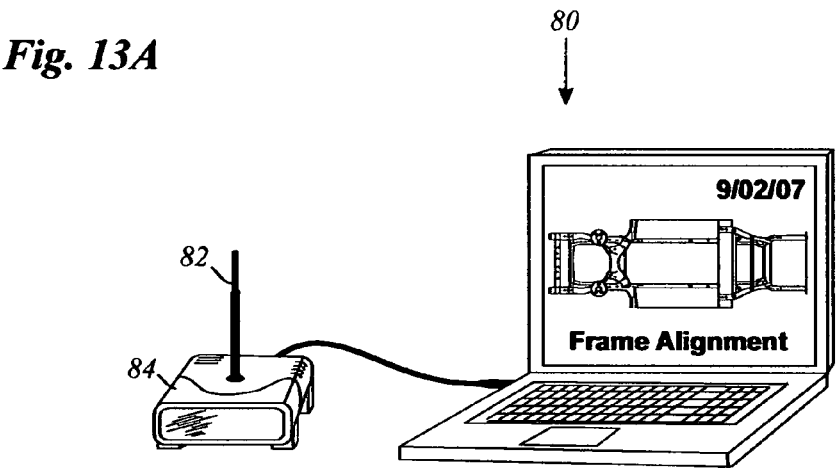
FIG. 13A shows a receiver and a computer for processing signals communicated between the computer and the portable gauge seen in FIG. 13.

FIG. 13A shows computer 80 in conjunction with receiver 84 and antenna 82 for communicating with a CCD or other modulated light source 50 seen in FIG. 13. The computer is used for arranging coordinates or measurements, illustrating graphics, and printing reports.

Portable elongated measuring gauge 52 may further be preset to a predetermined dimensional value relative to an undamaged control point 96 selectively located on or in proximity to the bottom side of the vehicle (see FIGS. 12 and 13). In this manner, a baseline may be properly established at a value with respect to the lowest control points on the vehicle. This is accomplished by positioning, in relation to scale 64 of gauge 52; either window 68 or electronic device 72 which is located at either the vertical pointer device 78 or squaring device 66 (see FIG. 3). Predetermined vehicle dimension specification data may be used for determining the preset dimensional values of the control point for the particular vehicle being measured. Portable gauge 52 may be handheld (see FIGS. 1 and 9) or adapted to sit on the frame machine or other surface (see FIGS. 5 and 6).

Portable gauge 52 may be positioned perpendicular to the vehicle with vertical pointer device 78 locating the control point on the bottom side of the vehicle and squaring device 66 positioned outwardly of the vehicle (see FIGS. 5 and 6). Squaring device 66, being preset to a predetermined dimensional value relative to the undamaged control point and positioned outwardly of the vehicle will establish a spatial location point outwardly of the vehicle for the predetermined dimensional value (see FIGS. 12 and 13).

Light beam 90, 92, or 92a may be projected from light source unit 20 or through device 50 to intersect squaring device 66 at the spatial location of the predetermined dimensional value (see FIGS. 12 and 13). Using a portable gauge 52 at two selected control points can align light beam 90 parallel to the vehicle's centerline (see FIG. 6). In this manner light beam 90 becomes baseline 90 which is a light beam established at a preset dimensional value at a spatial point located outwardly of the vehicle which runs parallel to the vehicle's centerline. All body and frame upper and lower length and width dimensions may be determined using this baseline.

Light beam 92 being aligned to squaring device 66 becomes baseline 92, which is a light beam established at a preset dimensional value at a spatial point located outwardly of the vehicle which is on a horizontal plane lower than the vehicle (see FIGS. 1, 5 and 6). All body and frame upper and lower height dimensions may be determined using this baseline.

The established baselines allow three dimensional measurements of the vehicle's upper and/or lower structure to be obtained without requiring the use of a fixed mechanical grid mechanism placed about the vehicle. Measurements are made by simply measuring between a point on the vehicle and the baselines (see FIGS. 1, 9 and 12).

Once baseline 90 and/or 92 is established, portable gauge 52 may be placed relative to a point on the vehicle and aligned to the light beam baseline using squaring device 66. A height measurement may be determined between portable gauge 52 and baseline 92 (see "a" in FIG. 9), a width measurement may be determined between a point on the vehicle and squaring device 66 (see "b" in FIGS. 9 and 11), and a length measurement may be determined between two points located on the vehicle by positioning portable gauge 52 to a first starting point, moving portable gauge 52 to a second ending point, and determining a distance that portable gauge 52 was moved along baseline 90 (see "c" in FIGS. 9 and 11). These measurements may then be compared to vehicle dimension specification data for determining actual vehicle body and/or frame dimensions.

In another aspect, a laser pointer may alternatively be used for locating a point on the vehicle. Shown in FIGS. 10 and 10A is portable measuring device 106 having a light source 108 such as a laser pointer projected to a first point located on the vehicle and sights 112 for squaring the device to baseline 90. The portable measuring device may then be moved along baseline 90 from the first point to a second point located on the vehicle. A distance between two the points may be determined along baseline 90 using the extended measuring tape to indicate the length (or distance that the measuring device was moved between points (see FIGS. 10 and 10A).

Alternatively, any of the devices described above may be used in any combination in order to achieve the objective of the present invention.

Ramifications and Scope

The present invention is not limited to just currently known camera, laser, and sensor technology, but may be upgraded to include any new or improved light sources or sensors using time of flight or any other new, useful, or improved measuring technique.

Accordingly, the reader will see that the present invention can be made and designed in different ways while achieving the same results. Although the description above contains much specificity, these should not be construed as limiting the scope of the present invention, but as merely providing illustrations of some of the present preferred embodiments of my measuring system. For example, the structure of the present invention may have other shapes, such as circular, oval, triangular, etc. The parts may be made of any material such as aluminum, metal, plastic, fiberglass, etc. Also various sizes may be used for any of the parts of the gauge assembly, measuring unit, light source and portable articulated mounting assembly, or any other component used with this system.

The portable articulated mounting assembly, shown in FIGS. 2 and 2A, may be placed on a support chosen from the group of, magnet, clamp, nut, bolt, dowel, weld, or equivalent device. The mounting assembly may then be adjusted so that the light source mounted to the assembly is positioned to a spatial location about the vehicle chosen from parameters located, below, above, under, inside, to the front, to the rear, or to the outer side of the vehicle. The mounting assembly may have at least one adjustment chosen from the group of pivotal, rotatable, telescoping, raisable, or lowerable adjustment in order to position the mounting assembly to the desired spatial location. The light source and mounting assembly may further be positioned outside the established baseline for determining a reference line which may be oblique or diagonal to the vehicle's centerline.

The articulated mounting assembly shown in FIG. 2 may support at least one device chosen from the group of manually leveling or self leveling laser, laser rangefinder and camera based rangefinder devices such as optical depth sensors, CCD sensors, CCD or CMOS camera, LED, various optical rangefinder devices, or their combination, which may have at least one emitted light source chosen from the group of, dot, eclipse, line, oval, vertical, horizontal, split light beam, depth perception light sources, radiated light in 2D or 3D, radiation emitter, radiation detector, position sensitive detector, or equivalent radiation source which may be used for communication between the light source and an object used for establishing a baseline, reference point, or bench mark, whereby vehicle measurements may be determined.

Various electronic devices and/or sensors may be included on the squaring device and or pointer attached to the gauge assembly, as shown in FIG. 3 for determining measurements between a point on a vehicle and a light beam. These sensors include photo or optical sensor, position sensitive detector, electronic sensor, digital measuring device, electronic transmitter, radiation emitter, radiation source, electromagnetic detector, coded sensor, or reflective sensor. For example, the squaring device may include an electronic sensor which will transmit a signal to a computer when a laser beam or camera detects the sensor. The computer shown in FIG. 3A may read this signal and provide instruction to the technician on whether the particular reference point is aligned or realigned with respect to the established baseline. The signal may also be triggered by voice command, wire lead, switch, or wireless remote control once the rangefinder is aligned in reference to the vehicle.

Non-electronic devices may include at least one selected from the group of alignment sight, graduation mark, or viewing window. These devices may be used on the squaring device and/or pointer for determining measurements or coordinates of points on the vehicle.

Alternative sensors may be used on the gauge assembly such as a bar code, reflective sensors, or optical sensor may be used on the length of bar and/or pointer of the present portable gauge assembly seen in FIG. 9. A laser scanner may be directed along the outer side of a vehicle's body or frame. The portable gauge may be placed between a point on the vehicle and the laser scanner for transferring or communicating the value of the location of the point from the vehicle to a path within the view of the laser scanner. The laser scanner may read a coded, reflective, optical, photo, or other equivalent sensor used on the gauge or squaring device and communicate data from the sensor to a computer for processing measurements, arranging measurements, storing and retrieving data, displaying graphics, printing reports, etc.

Sensors relative to the portable gauge may transmit or receive a wireless signal, such as bluetooth, ultra sound, infrared, light or optical signal, radio frequencies, or equivalent signal. These signals may be sent to a computer for arranging measurements for onscreen viewing of graphics illustrations, storing and retrieving data and printing reports.

The portable linear measuring unit (an alternative portable gauge device) shown in FIGS. 10 and 10A may include at least one chosen from the group of a laser mounted perpendicular to a measuring tape, laser rangefinder or camera rangefinder mounted perpendicular to a measuring tape, laser rangefinder or camera rangefinder mounted perpendicular to a measuring tape placed on each side of the rangefinder, a laser mounted perpendicular to at least one other laser, a rangefinder used alone which may be rotated or pivoted to locate and/or measure distances to targets or other references located on the vehicle. Additional devices which may be used with any of these devices may further include at least one of an optical sensor, encoder device, ultra sound device, measuring wheel, or radiator source. Alternatively, any of the mentioned devices may be used in any combination.

The linear measuring unit shown FIG. 10A may further be used with a device that will raise the measuring unit to an elevation above a pinch weld clamp mounted on a frame machine. The measuring unit can be raised by adding a block device or magnet device under the linear measuring unit. An additional raised magnet device may be used for raising and securing a tip 116 of a measuring tape (seen in FIG. 10A) which may be used with the linear measuring unit.

Pivotal target 98 seen in FIG. 7A may alternatively include an electronic marker having at least one selected from the group of optical or photo sensor, electronic transmitter, reflective sensor, coded sensor, radiation emitter or other radiation source, position sensitive detector, or their equivalent which will allow communication with a computer of location, position, or measurement of marker 104.

While I have described successful structures for constructing my measuring apparatus, it is possible in the art to make various modifications and still achieve the results desired without departure from the invention. Thus the scope of my vehicle dimensional measuring system should be determined by the appended claims and their legal equivalents, rather than by the examples given.

We claim:

1. An apparatus for measuring a vehicle's structure without requiring the use of a fixed mechanical grid mechanism, comprising:

at least one portable elongated gauge having at least one linear measuring scale, a means for locating a point on a vehicle, a means for leveling said gauge, and a means for squaring an alignment between said gauge and at least one light beam; and a light source device comprising an arm having a base for placing said arm on or in proximity to said vehicle, a mount for mounting a light beam means relative to said arm, a means for rotating said light beam means in a horizontal plane on said mount while said arm is simultaneously rotated in the same or opposite direction of said light beam means without eliminating the level orientation of said light beam means, whereby said light source device can be placed on or in proximity to said vehicle with at least one light beam being emitted from said light source device, said portable elongated gauge can be placed relative to a point on said vehicle and positioned using said squaring means to align said gauge to said light beam, whereby at least one light beam baseline can be established and measurements can be determined between said baseline and points located on the vehicle's upper and/or lower structure.

2. The apparatus according to claim 1, wherein said light source device further includes a self leveling laser for projecting a longitudinal vertical plane of light and/or a horizontal plane of light.

3. The apparatus according to claim 1, wherein said light source device further includes means for raising or lowering said light beam means.

4. The apparatus according to claim 1, wherein said portable elongated gauge further includes a base for placing said gauge in relation to said vehicle.

5. The apparatus according to claim 1, wherein said squaring means includes a perpendicular shaped body having opposite sighting ends.

6. An apparatus for measuring a vehicle's structure without requiring the use of a fixed mechanical grid mechanism, comprising:

a light source device comprising an arm having a base for placing said arm on or in proximity to said vehicle, a mount for mounting a light beam means relative to said arm, a means for rotating said light beam means in a horizontal plane on said mount while said arm is simultaneously rotated in the same or opposite direction of said light beam means without eliminating the level orientation of said light beam means; and a portable measuring means for measuring between a point on said vehicle and at least one light beam emitted from said light beam means.

7. The apparatus according to claim 6, wherein said portable measuring means further includes a pointer for locating a point on said vehicle.

8. The apparatus according to claim 6, wherein said portable measuring means further includes means for aligning said measuring means relative to one or more light beams.

9. The apparatus according to claim 6, wherein said portable measuring means further includes a base for placing said measuring means in relation to said vehicle.

10. The apparatus according to claim 6, further including means for determining a height measurement relative to a point located on said vehicle.

11. The apparatus according to claim 6, further including means for determining a width measurement relative to a point located on said vehicle.

12. The apparatus according to claim 6, further including means for determining a length measurement relative to a point located on said vehicle.

13. The apparatus according to claim 6, wherein said light beam means is self leveling.

14. The apparatus according to claim 6, wherein said light source device further includes means for adjusting an elevation of said light beam means.

15. The apparatus according to claim 6, wherein said light source device further includes means for projecting a longitudinal vertical plane of light and/or a horizontal plane of light.

16. The apparatus according to claim 6, wherein said light source device includes a CCD camera or laser.

17. The apparatus according to claim 6, wherein said portable measuring means includes an attached radiation device.

18. The apparatus according to claim 6, further including means for electronically determining one or more measurements relative to said vehicle.

19. The apparatus according to claim 6, further including means for displaying at least one measurement relative to at least one point located on said vehicle.

20. A method for establishing a light beam baseline which is used for dimensionally measuring a vehicle's body or frame, implemented using a portable measuring apparatus which does not require the use of a fixed mechanical grid mechanism, comprising:
- a first step for establishing a predetermined dimensional value at a spatial point which is located outward of a vehicle, said dimensional value being relative to a predetermined dimensional value of a selected undamaged control point located on or in proximity to a bottom side of said vehicle; and
- a second step for projecting at least one light beam to intersect said predetermined dimensional value at said spatial point, wherein said light beam becomes a baseline established at said predetermined dimensional value at said spatial point, whereby said baseline can be used for dimensionally measuring points on the vehicle's upper and/or lower body which can be compared to predetermined vehicle dimension specification data.

* * * * *